J. B. OLDS
SEMITRAILER AND TRACTOR THEREFOR.
APPLICATION FILED OCT. 17, 1918.
1,316,735.
Patented Sept. 23, 1919.
2 SHEETS—SHEET 1.
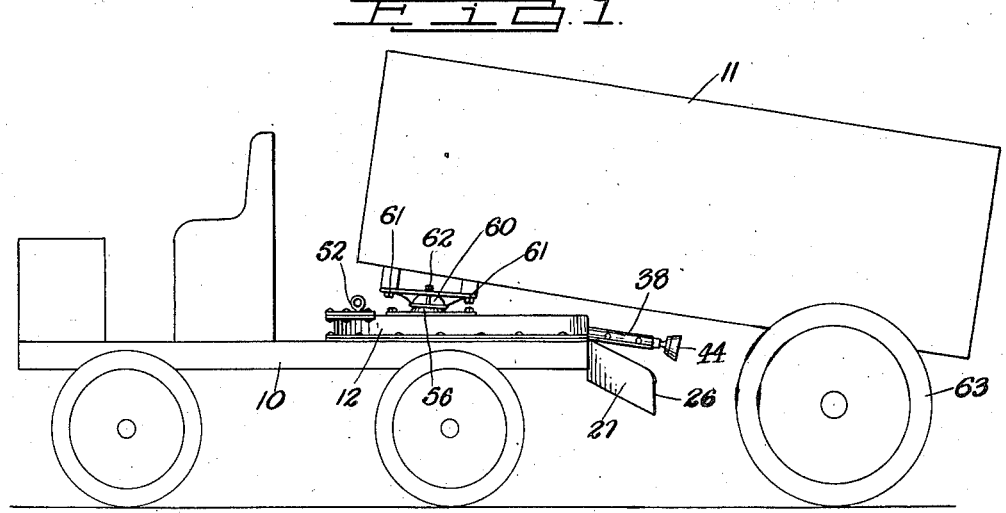
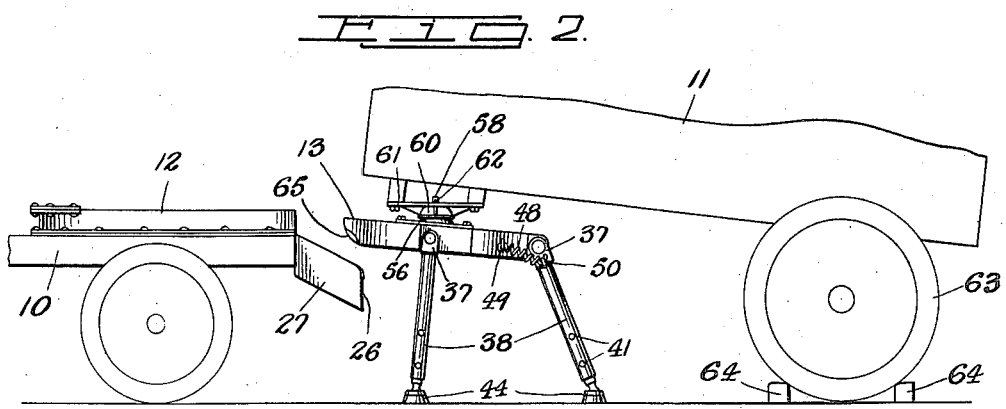
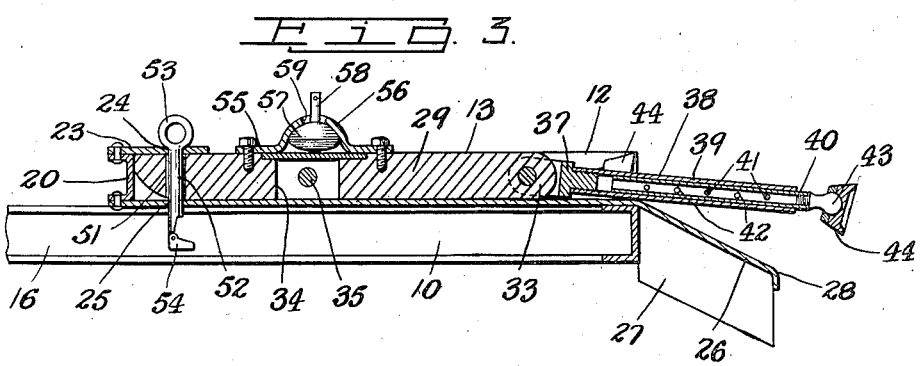
Inventor
James B. Olds
By his Attorneys

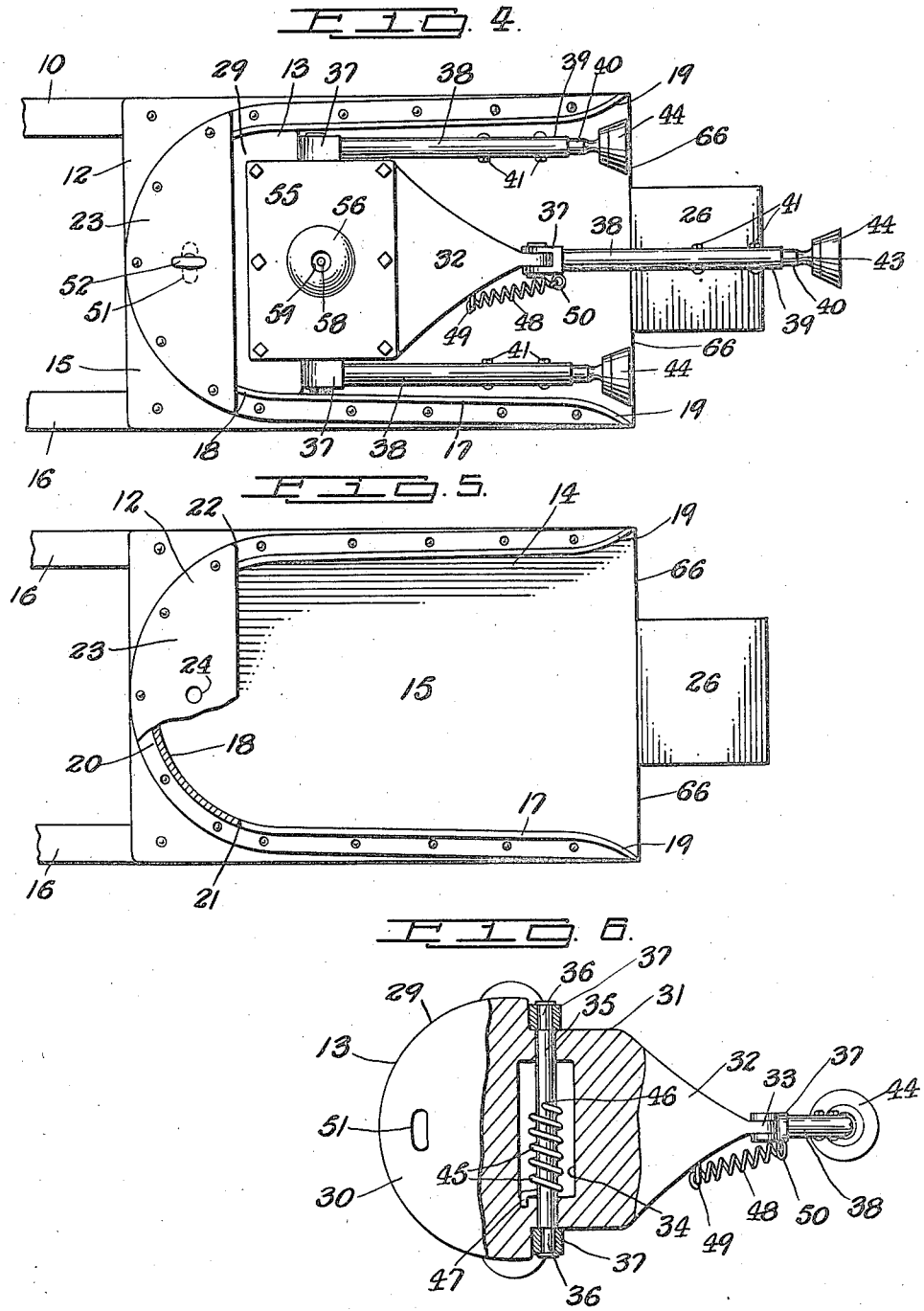

UNITED STATES PATENT OFFICE.

JAMES BRYANT OLDS, OF MASPETH, NEW YORK.

SEMITRAILER AND TRACTOR THEREFOR.

1,316,735.

Specification of Letters Patent. Patented Sept. 23, 1919.

Application filed October 17, 1918. Serial No. 258,508.

*To all whom it may concern:*

Be it known that I, JAMES BRYANT OLDS, a citizen of the United States, and residing at Maspeth, in the county of Queens and State of New York, have invented certain new and useful Improvements in Semitrailers and Tractors Therefor, of which the following is a specification, such as will enable those skilled in the art to which it appertains to make and use the same.

This invention relates to apparatus for coupling and uncoupling semi-trailers with tractors and for automatically supporting the semi-trailers when uncoupled from the tractor, and the object of the invention is to provide an apparatus of the class specified, one part of which is connected with and carried by the trailer and serves to support the same, and the other part of which is carried by the tractor and operates in connection with the part carried by the trailer; a further object being to provide an apparatus of the class specified which is automatic in operation both in the operation of coupling a trailer with a tractor or uncoupling the same therefrom; and with these and other objects in view the invention consists in an apparatus of the class specified, constructed and operating as hereinafter described and claimed.

The invention is fully disclosed in the following specification, of which the accompanying drawings form a part, in which the separate parts of my improvement are designated by suitable reference characters in each of the views, and in which:—

Figure 1 is a side view indicating a semi-trailer coupled with a tractor by my improved apparatus;

Fig. 2 a view similar to Fig. 1 but showing the semi-trailer uncoupled from the tractor and the front of the semi-trailer supported by the part carried thereby;

Fig. 3 a partial central sectional view of my improved apparatus, with the parts in the position shown in Fig. 1 and indicating its connection with the rear end of the tractor;

Fig. 4 a plan view of the construction as shown in Fig. 3;

Fig. 5 a view similar to Fig. 4 but showing only that part of the apparatus which is carried by the tractor and with part of the construction broken away and in section; and, Fig. 6 a view similar to Fig. 4 but showing that part of my apparatus which is carried by the semi-trailer and showing the parts thereof in the position shown in Fig. 2.

In Figs. 1 and 2 of the drawings, I have indicated at 10 a tractor of any desired form and construction, and at 11 what is known as a semi-trailer drawn from place to place by the tractor 10 when coupled therewith.

In the practice of my invention I provide a coupling and tractor supporting apparatus which consists of two main parts 12 and 13; the part 12 is carried by the tractor 10 and the part 13 by the trailer 11.

The part 12 of the apparatus consists in the construction shown of a casing 14 composed of a bottom plate 15 secured to the top of the rear end portion of the chassis frame 16 of the tractor, and an angle-iron strip 17 bent into U-shaped fashion to form an arc-shaped cross head 18 and flaring ends 19, as clearly shown in Fig. 5 of the drawing. The arc-shaped cross head 18 of the angle-iron 17 is of channel form as shown at 20 in Fig. 3, and extends from the point 21 to the point 22 Fig. 5, and an arc-shaped plate 23 is secured to the top of the strip 17, or the channel iron section 20 thereof and provided approximately centrally with an aperture 24.

The bottom plate 15 is provided with an aperture 25 in vertical alinement with the aperture 24 and the rear end of said plate is provided with a backwardly directed inclined portion 26 having depending side members 27, which serve to reinforce the inclined portion 26, and the free edge of the inclined portion 26 is rounded as shown at 28 in Fig. 3 of the drawing. The above construction completes the part 12 which is secured to and carried by the tractor.

The part 13, which is carried by the trailer 11, consists of a body portion 29 having a front arc-shaped or semi-circular portion 30, a substantially rectangular central portion 31 and a backwardly directed triangular portion 32 having a central ear 33. The central body portion 31 is provided with an elongated aperture 34 and a shaft 35 is mounted in said portion and centrally of the aperture 34, as clearly illustrated in Fig. 6.

The ends of the shaft 35 are provided with trunnions 36 on which are rotatably mounted blocks 37 carrying telescoping legs 38 and a similar block 37 is pivoted to the ear 33 and also carries a telescoping leg 38. The telescoping legs 38 each consist of an outer tubular casing 39 and an inner tubular casing 40 adjustably connected by bolts 41 passed through a plurality of apertures 42 in the inner tubular casing 40 and through two apertures in the outer tubular casing, as clearly illustrated in Figs. 2 and 3 of the drawing. The lower or free end of the tubular casing 40 of each of the legs 38 carries a knuckle member 43 with which is connected a foot piece 44, which has a swiveled connection with the knuckle member 43.

The telescoping legs 38 on the ends of the shaft 35 are normally held in the position shown in Figs. 2 and 6 by a heavy spiral spring 45 secured to the shaft 35 as shown at 46 and to the central rectangular portion 31 of the part 13, as shown at 47 in Fig. 6 of the drawing. Another spiral spring 48 is secured to the backwardly directed triangular portion 33 of the part 13 as shown at 49, and to the upper end portion of the telescoping leg 38 pivoted to the ear 33 as shown at 50 and serves to normally hold said leg in the position shown in Figs. 2 and 6 of the drawings.

The arc-shaped or semi-circular portion 30 of the part 13 is provided with an elongated aperture 51 through which and the apertures 24 and 25 in the plates 23 and 15 respectively is passed a coupling pin 52 provided at its upper end with a ring or eye 53, and at its lower end with a pivoted member 54 which serves to prevent the accidental removal of the coupling pin when in the position shown in Fig. 3 of the drawings.

Secured to the top face of the central rectangular portion 31 of the part 13 is a plate 55, having a central semi-circular raised portion 56 in which is mounted a disk-shaped member 57 carrying a pin 58 which passes upwardly through an enlarged aperture 59 in the top of the semi-circular portion 56. This construction, namely, the parts 55 to 59 inclusive is old and forms no part of my invention other than to show a means of providing a swivel or universal connection of the trailer 11 with the part 13 and, in practice, the usual concavo-convex seat member 60 is secured to the bottom of the front end portion of the trailer 11 as shown at 61, and the pin 58 passes upwardly through the seat member 60 and the parts may be held in connection or against accidental displacement by a cotter or similar pin 62 passed through the upper end portion of the pin 58.

With the parts in the position shown in Figs. 1, 3 and 4, the trailer 11 is shown coupled with the tractor 10 and the part 13 of the trailer is secured to and within the part 12 of the tractor, the front arc-shaped portion 30 of the part 13 fitting within the arc-shaped cross head 18 of the part 12 with the coupling pin 52 passed through the apertures 24, 25 and 51. In this position of the parts it will be seen that the telescoping legs 38 on the ends of the shaft 35 lie within the angle-iron side portions of the part 12 and the other telescoping leg 38 extends backwardly over the inclined portion 26, as clearly illustrated in Fig. 4.

When it is desired to uncouple the trailer from the tractor, the coupling pin 52 is removed by swinging the member 54 into vertical position to permit of the withdrawal of said pin from the apertures 24, 25 and 51, after which the rear wheels 63 of the trailer are blocked as shown at 64 to prevent the accidental rolling or other movement of the trailer, after which the tractor is moved forwardly, in which operation the part 13 on the trailer slides backwardly on the part 12 of the tractor and the telescoping legs 38 are moved downwardly into a position similar to that shown in Fig. 2, by the springs 45 and 48, and when the tractor is entirely freed from the trailer, or the part 13, the trailer will be supported by the three legs 38 of the part 13.

When it is desired to recouple the tractor 10 with the trailer 11, the trailer will be in the position shown in Fig. 2 with the rear wheels thereof blocked as shown at 64, and the tractor 10 carrying the part 12 will be backed into and beneath the part 13 of the trailer in approximately central alinement with the rear telescoping leg 38 and the elongated aperture 51 of the part 13, and in this operation the backwardly directed inclined portion 26 will strike the front curved edge 65 of the arc-shaped portion 30 and lift the part 13 upwardly onto the bottom plate 15 as the tractor 10 moves backwardly and as this operation continues the rear edge portion 66 of the part 12 at the opposite sides of the backwardly directed inclined portion 26 will strike the telescoping legs 38 on the ends of the shaft 35 and move them into approximately horizontal position against the tension of the spring 45, and the curved edge 28 of the backwardly directed inclined portion 26 will strike the rear telescoping leg 38 and raise it into an approximately horizontal position against the tension of the spring 48, and when this operation is completed, or the tractor 10 has been moved backwardly so as to bring the part 13 entirely within the part 12, the coupling pin 52 is passed through the apertures 24, 25 and 51 and the trailer and tractor are again recoupled.

By providing the telescoping legs 38 on the part 13 a single tractor may be used in connection with various sizes of trailer or trailers of different height, and by providing the swivel foot members 44 on the ends of said legs, the same will always find a sound or firm footing on uneven ground.

With my improved apparatus a tractor may be coupled with a trailer either in common alinement with the tractor, as shown in the accompanying drawings, or at an angle to the trailer or within ninety-degrees to the left or right of the position shown in the drawings. In the use of trailers and tractors, or in the operation of coupling or uncoupling the same, it has been found that under certain conditions the tractor must be uncoupled from the trailer at an angle to the central longitudinal plane of the trailer, and with my improvement and especially in view of the swivel or universal connection of the part 13 with the trailer 11, I may uncouple the tractor 10 from the trailer 11 at any angle up to ninety degrees from the central longitudinal plane of the trailer, it being understood that in recoupling the tractor with the trailer, the tractor must be backed into the trailer at the same angle at which it was uncoupled, or with the part 13 in the same longitudinal plane as the part 12 of the tractor.

My improved apparatus is automatic in operation with the exception of the withdrawal of the coupling pin 52 and as is evident from the foregoing description the use of said apparatus avoids the necessity of jacking up the front end of the trailer as has heretofore been customary, which operation has frequently resulted in accidents involving serious injury and sometimes the life of the operator or operators; but with my improvement the above dangers are obviated and no risks taken in the operation of coupling a trailer with a tractor, or disconnecting said trailer from the tractor, and while I have shown certain details of construction for carrying my invention into effect, it is evident that the said invention is not limited to such details, and various changes therein and modifications thereof may be made, within the scope of the appended claims, without departing from the spirit of the invention or sacrificing its advantages.

Having fully described my invention, what I claim as new and desire to secure by Letters Patent, is:—

1. In an apparatus for coupling and uncoupling a trailer with a tractor and for supporting the trailer when uncoupled, a part carried by the tractor and a movable part carried by the trailer, and means connected with said last named part for supporting the trailer when uncoupled.

2. In an apparatus for coupling and uncoupling a trailer with a tractor and for supporting the tractor when uncoupled, a part carried by the trailer and a part carried by the tractor, said trailer part being provided with a universal connection with the trailer, and means on said last named part for supporting the trailer when uncoupled.

3. In an apparatus for coupling and uncoupling a trailer with a tractor and for supporting the trailer when uncoupled, a part carried by the tractor and a part carried by the trailer, means for connecting said parts to couple the trailer with the tractor, the part carried by the trailer being universally connected therewith, and means on said last named part for supporting the trailer when the coupling means is withdrawn.

4. In an apparatus for automatically coupling and uncoupling a trailer with a tractor and for supporting the trailer when uncoupled, a part carried by the tractor consisting of a casing which opens backwardly and the rear end of which is provided with a downwardly directed inclined portion and a part carried by the trailer consisting of a body portion adapted to pass upwardly over the inclined portion of the other part and onto said casing, said last named part being universally connected with the trailer, and supporting legs connected with the body portion of said last named part and adapted to support the trailer when uncoupled from the tractor.

5. In an apparatus for automatically coupling and uncoupling a trailer with a tractor and for supporting the trailer when uncoupled, a part carried by the tractor consisting of a casing which opens backwardly and the rear end of which is provided with a downwardly directed inclined portion and a part carried by the trailer consisting of a body portion adapted to pass upwardly over the inclined portion of the other part and onto said casing, said last named part being universally connected with the trailer, a plurality of legs pivoted to the body portion of said last named part, and tensional devices for moving said legs into operative position to support the tractor when uncoupled.

6. In an apparatus for coupling and uncoupling a trailer with a tractor and for supporting the trailer when uncoupled, a part carried by the tractor consisting of a casing which opens backwardly and the rear end of which is provided with a downwardly directed inclined portion and a part carried by the trailer consisting of a body portion adapted to pass upwardly over the inclined portion of the other part and onto said casing and to be coupled with said first named part by a coupling pin passed through both of said parts, the part carried by the trailer being universally connected therewith, telescoping legs pivotally connected with the body portion of said last named part, and tensional devices for moving said legs into operative position when the trailer is uncoupled from the tractor.

7. In an apparatus for coupling and uncoupling a trailer with a tractor and for supporting the trailer when uncoupled, a part carried by the tractor consisting of a casing which opens backwardly and the rear end of which is provided with a downwardly directed inclined portion and a part carried by the trailer consisting of a body portion adapted to pass upwardly over the inclined portion of the other part and onto said casing and to be coupled with said first named part by a coupling pin passed through both of said parts, the part carried by the trailer being universally connected therewith, telescoping legs pivotally connected with the body portion of said last named part, tensional devices for moving said legs into operative position when the trailer is coupled from the tractor, the free ends of the telescoping legs being provided with feet having a swiveled connection with said legs.

8. In an apparatus of the class described, a trailer supporting member connected with the front end portion of said trailer by means of a universal joint construction, said member consisting of a body portion, a plurality of legs pivoted to the body portion, and tensional means for moving said legs into operative position to support the front end portion of the trailer.

9. In an apparatus of the class described, a trailer supporting member connected with the front end portion of said trailer by means of a universal joint construction, said member consisting of a body portion, a plurality of legs pivoted to the body portion, tensional means for moving said legs into operative position to support the front end portion of the trailer, a casing connected with the rear end portion of a tractor, said casing being provided with a backwardly and downwardly inclined portion which permits the passage of the body portion of said supporting member of the trailer to pass upwardly on to the casing of the tractor in the operation of coupling the trailer therewith and a coupling pin adapted to be passed downwardly through said casing and the body portion of said supporting member.

10. In an apparatus of the class described, a trailer supporting member connected with the front end portion of said trailer by means of a universal joint construction, said member consisting of a body portion, a plurality of legs pivoted to the body portion, tensional means for moving said legs into operative position to support the front end portion of the trailer, a casing connected with the rear end portion of a tractor, said casing being provided with a backwardly and downwardly inclined portion which permits the passage of the body portion of said supporting member of the trailer to pass upwardly onto the casing of the tractor in the operation of coupling the trailer therewith and a coupling pin adapted to be passed downwardly through said casing and the body portion of said supporting member, and said casing and the backwardly directed inclined portion thereof being adapted to move the legs of the body portion into inoperative position in the operation of coupling the trailer with the tractor.

11. In an apparatus of the class described, a trailer supporting member, means for connecting said member with the trailer whereby a tractor may be coupled with the trailer within the arc of one hundred and eighty degrees from a plane transverse to the longitudinal plane of a trailer, and tensionally operated supporting legs movably connected with said member and adapted to support the trailer when uncoupled from the tractor.

12. In an apparatus of the class described, a trailer supporting member, means for connecting said member with the trailer whereby a tractor may be coupled with the trailer within the arc of one hundred and eighty degrees from a plane transverse to the longitudinal plane of a trailer, and three adjustable and tensionally controlled legs connected with said member and adapted to support the trailer when uncoupled from the tractor.

13. In an apparatus of the class described, a trailer supporting member, means for connecting said member with the trailer whereby a tractor may be coupled with the trailer within an arc of one hundred and eighty degrees, and supporting legs movably connected with said member and normally held in a raised position when the trailer is coupled to the tractor and adapted to support the trailer when uncoupled from the tractor.

14. In an apparatus of the class described, a trailer supporting member movably connected with the front end portion of said trailer, said member consisting of a body portion, a plurality of legs pivoted to the the body portion, and means for moving said legs into operative position to support the front end portion of the trailer.

15. In an apparatus of the class described, a trailer supporting member, means for movably connecting said member with the trailer whereby the tractor may be coupled with the trailer within an arc of one hundred and eighty degrees from a plane transverse to the longitudinal plane of the tractor, said trailer supporting member being provided with a plurality of movable legs adapted to support the trailer when uncoupled from the tractor.

16. The herein described means for connecting a trailer with a tractor comprising a supporting member movably connected with the front end portion of the trailer, said member consisting of a body portion, a plurality of legs pivoted to the body portion, and means for moving said legs into operative position to support the front end portion of the trailer.

17. The herein described means for connecting a trailer with a tractor, comprising a supporting member, means for connecting said member with the trailer whereby said trailer and tractor may be connected anywhere within an arc of one hundred and eighty degrees, and supporting legs movably connected with said member and normally held in a raised position when the trailer is coupled to the tractor and adapted to support the trailer when uncoupled from the tractor.

In testimony that I claim the foregoing as my invention I have signed my name in presence of the subscribing witnesses this 14th day of October, 1918.

JAMES BRYANT OLDS

Witnesses:
C. E. MULREANY,
H. E. THOMPSON.